US012596290B2

(12) United States Patent
Krafka et al.

(10) Patent No.: US 12,596,290 B2
(45) Date of Patent: Apr. 7, 2026

(54) DAY/NIGHT FILTER GLASS FOR AIRCRAFT CAMERA SYSTEMS

(71) Applicant: WING AVIATION LLC, Mountain View, CA (US)

(72) Inventors: Kyle Krafka, Los Altos, CA (US); Dinuka Abeywardena, Mountain View, CA (US)

(73) Assignee: Wing Aviation LLC, Palo Alto, CA (US)

( * ) Notice: Subject to any disclaimer, the term of this patent is extended or adjusted under 35 U.S.C. 154(b) by 66 days.

(21) Appl. No.: 18/399,076

(22) Filed: Dec. 28, 2023

(65) Prior Publication Data

US 2025/0216745 A1      Jul. 3, 2025

(51) Int. Cl.
| | |
|---|---|
| *G03B 11/00* | (2021.01) |
| *B64U 101/30* | (2023.01) |
| *G02B 5/20* | (2006.01) |
| *G02B 5/26* | (2006.01) |
| *G03B 15/00* | (2021.01) |

(Continued)

(52) U.S. Cl.
CPC .............. *G03B 11/00* (2013.01); *G02B 5/208* (2013.01); *G02B 5/26* (2013.01); *G03B 15/006* (2013.01); *G06T 7/70* (2017.01); *G06V 20/17* (2022.01); *H04N 7/183* (2013.01); *H04N 23/11* (2023.01); *B64U 2101/30* (2023.01); *G06T 2207/10032* (2013.01); *G06T 2207/10152* (2013.01)

(58) Field of Classification Search
CPC ......... G03B 11/00; G03B 15/006; G06T 7/70;
G06T 2207/10032; G06T 2207/10152;
G06V 20/17; H04N 23/11; H04N 7/183;
G02B 5/208; G02B 5/26; B64U 2101/30
See application file for complete search history.

(56) References Cited

U.S. PATENT DOCUMENTS

| | | | |
|---|---|---|---|
| 8,248,692 | B2 | 8/2012 | Wu |
| 8,408,821 | B2 | 4/2013 | Wu et al. |

(Continued)

FOREIGN PATENT DOCUMENTS

| | | | | |
|---|---|---|---|---|
| CN | 115185288 A | 10/2022 | | |
| KR | 10-2014-0086431 A | 7/2014 | | |
| WO | WO-2021239347 A1 * | 12/2021 | ........... | G03B 17/565 |

OTHER PUBLICATIONS

PCT International Search Report and Written Opinion mailed Mar. 12, 2025, in corresponding PCT Application No. PCT/US2024/057426, 11 pages.

*Primary Examiner* — Kenneth M Dunne
(74) *Attorney, Agent, or Firm* — Christensen O'Connor Johnson Kindness PLLC

(57) ABSTRACT

A technique for using an onboard camera capable of day and night operation on an unmanned aerial vehicle (UAV) includes: traveling along a route of the UAV at night; and acquiring an aerial image with an onboard camera. The onboard camera includes: a sensor device for receiving photons and converting the photons into photoelectrons; a processor for processing the photoelectrons into an image file; a lens positioned adjacent to the sensor device for focusing the photons on the sensor device; and a filter positioned adjacent an outer surface of the lens. The filter can permit photons in the infrared light spectrum to pass to the lens, and attenuate at least a portion of the photons in the visible light spectrum prior to reaching the lens.

24 Claims, 4 Drawing Sheets

(51) Int. Cl.
    *G06T 7/70*         (2017.01)
    *G06V 20/17*      (2022.01)
    *H04N 7/18*       (2006.01)
    *H04N 23/11*     (2023.01)

(56)            References Cited

U.S. PATENT DOCUMENTS

| | | |
|---|---|---|
| 11,543,626 B2 | 1/2023 | Bone |
| 12,227,318 B1 * | 2/2025 | Bata ........................ B64U 20/83 |
| 2018/0031745 A1 * | 2/2018 | Kim ......................... G02B 5/26 |
| 2019/0188906 A1 * | 6/2019 | Krishna ................. G06T 7/579 |
| 2020/0126239 A1 * | 4/2020 | Qian ........................ G06T 7/20 |
| 2020/0244856 A1 * | 7/2020 | Kim ....................... H04N 23/57 |
| 2020/0371528 A1 | 11/2020 | Howard |
| 2022/0283442 A1 | 9/2022 | Lee et al. |
| 2022/0315220 A1 * | 10/2022 | Bachrach .............. G05D 1/243 |
| 2023/0129320 A1 * | 4/2023 | Wu ........................ H04N 25/50 |
| | | 250/201.1 |

* cited by examiner

DAY/NIGHT FILTER GLASS FOR AIRCRAFT CAMERA SYSTEMS

TECHNICAL FIELD

This disclosure relates generally to filter glass for aircraft onboard camera systems, and in particular but not exclusively, relates to using filter glass on aircraft onboard camera systems to limit visible light and prevent overexposure in bright light conditions, while permitting infrared light transmission during low light conditions.

BACKGROUND INFORMATION

An unmanned vehicle, which may also be referred to as an autonomous vehicle, is a vehicle capable of traveling without a physically present human operator. Various types of unmanned vehicles exist for various different environments. For instance, unmanned vehicles exist for operation in the air, on the ground, underwater, and in space. Unmanned vehicles also exist for hybrid operations in which multi-environment operation is possible. Unmanned vehicles may be provisioned to perform various different missions, including payload delivery, exploration/reconnaissance, imaging, public safety, surveillance, or otherwise. The mission definition will often dictate a type of specialized equipment and/or configuration of the unmanned vehicle.

Unmanned aerial vehicles (also referred to as drones) can be adapted for package delivery missions to provide an aerial delivery service. One type of unmanned aerial vehicle (UAV) is a vertical takeoff and landing (VTOL) UAV. VTOL UAVs are particularly well-suited for package delivery missions. The VTOL capability enables a UAV to takeoff and land within a small footprint thereby providing package pick-ups and deliveries almost anywhere. To safely deliver packages in a variety of environments, the UAV should have a camera system capable of operation in bright and low light environments for visual triangulation and navigation, and detecting and avoiding obstacles, as well as operating as an optical code scanner for reading visual codes affixed to packages.

BRIEF DESCRIPTION OF THE DRAWINGS

Non-limiting and non-exhaustive embodiments of the disclosure are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Figure 1:
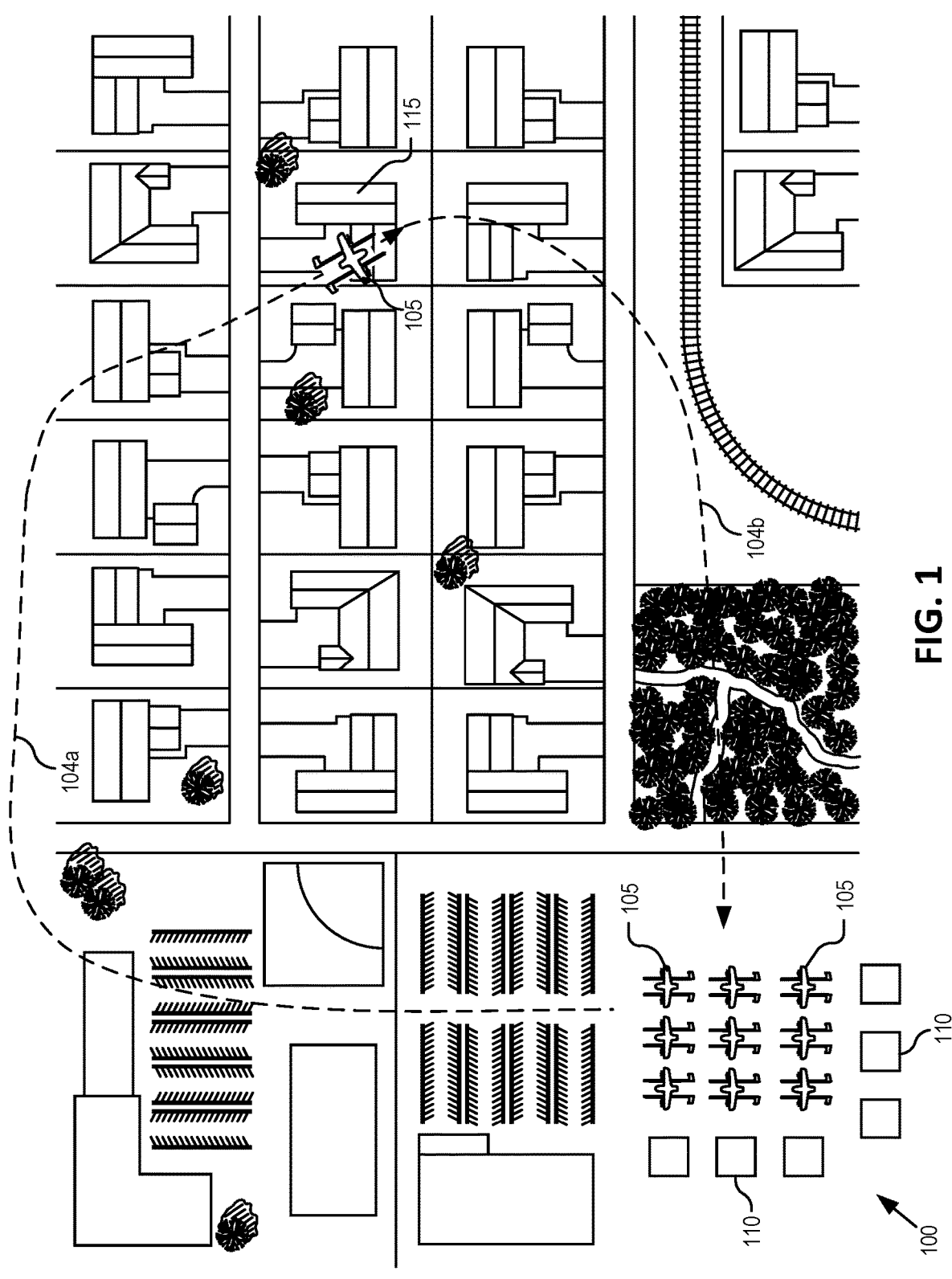
FIG. 1 illustrates a fleet of unmanned aerial vehicles (UAVs) staged at a terminal area to provide a package delivery service to a neighborhood, in accordance with an embodiment of the disclosure.

Embodiments of an onboard camera system for aircraft, such as a UAV, that is configured for day and night operation are described herein. The onboard camera systems of the present disclosure utilize filter glass to limit visible light and prevent overexposure of the camera sensor in bright light conditions, while permitting maximal infrared light transmission during low light conditions. The filter glass of the present disclosure can also provide a weather sealing enclosure to the lens system and serve as a surface to apply protective coatings against fingerprints, water, dust, etc. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments disclosed herein provide a technique for UAVs to use onboard camera systems to fulfill operation objectives, both during the day when bright light conditions can cause overexposure, and at night when low light conditions can cause underexposure (or alternatively, excessive noise and/or motion blur), each condition leading to poor system performance. Overexposure is caused by the imaging sensor of the camera exceeding a physical limitation known as "full well capacity," which is the amount of charge that can be stored within an individual sensor pixel without the pixel becoming saturated. When the amount of light energy exceeds the full well capacity, the sensor is overwhelmed and the saturation leads to a degradation in the signal (overexposure). Typically, overexposure is preventing in software by turning down the sensor gain, but a portion of the image can still experience overexposure, even with the gain set to a minimum, necessitating the embodiments of the present disclosure. Excessive noise and/or motion blur can occur with insufficient light, because the software processing the sensor data will increase the gain, causing noise artifacts, and increase the exposure time in parallel, causing motion blur artifacts. After the gain and exposure is increased to maximum capacity, the image will be underexposed. The exposure time can be limited in software to an acceptable motion blur level, but these motion blur issues can surface prior to getting unwanted noise artifacts or underexposure.

Embodiments of the glass filters disclosed herein can be tailored to attenuate visible light such that the camera sensor does not reach full well capacity in direct sunlight or over bright surfaces, such as concrete. In this regard, a portion of the light energy is blocked by the glass filter, lowering the intensity of the light reaching the sensor to reduce the tendency of overexposure during these conditions. For performance in low light conditions, the glass filters disclosed herein can be further tailored to pass infrared light (IR) through the filter to the sensor during night operation. In these conditions, the passing of the IR light can cause the camera to receive enough light energy to function in low light conditions and reduce the tendency of underexposure.

Although the embodiments described herein may include camera sensors that are configured to operate in grayscale, the embodiments may also be suitable for full-color camera sensors, or other types of camera sensors. The embodiments of the present disclosure are also suitable for use as a mechanical filter, e.g., a filter that is mechanically applied to the lens when desired and then physically removed when the filter effects are not desired.

FIG. 1 is a plan view illustration of a terminal area 100 for staging UAVs 105 that deliver packages to a neighborhood, in accordance with an embodiment of the disclosure. The UAVs 105 may one day routinely deliver small items into urban or suburban neighborhoods from small regional or neighborhood hubs such as the terminal area 100. The vendor facilities 110 may be set up adjacent to the terminal area 100 to take advantage of the aerial delivery service. A typical aerial delivery mission may include loading a UAV 105 with a package from a vendor facility 110 at the terminal area 100, where it ascends to a cruise altitude to follow an approach route 104a to a customer destination 115. At the customer destination 115, the UAV 105 descends for package drop-off before once again ascending to a cruise altitude for the return journey along a return route 104b back to the terminal area 100.

During the course of a delivery mission, static and dynamic obstacles may be an ever present hazard, and the UAV 105 may need to identify further packages by scanning information. Detection and avoidance of these obstacles is important for safe UAV navigation, and package identification is important for fulfilling the objectives of the flight of the UAV.

Figure 2A:
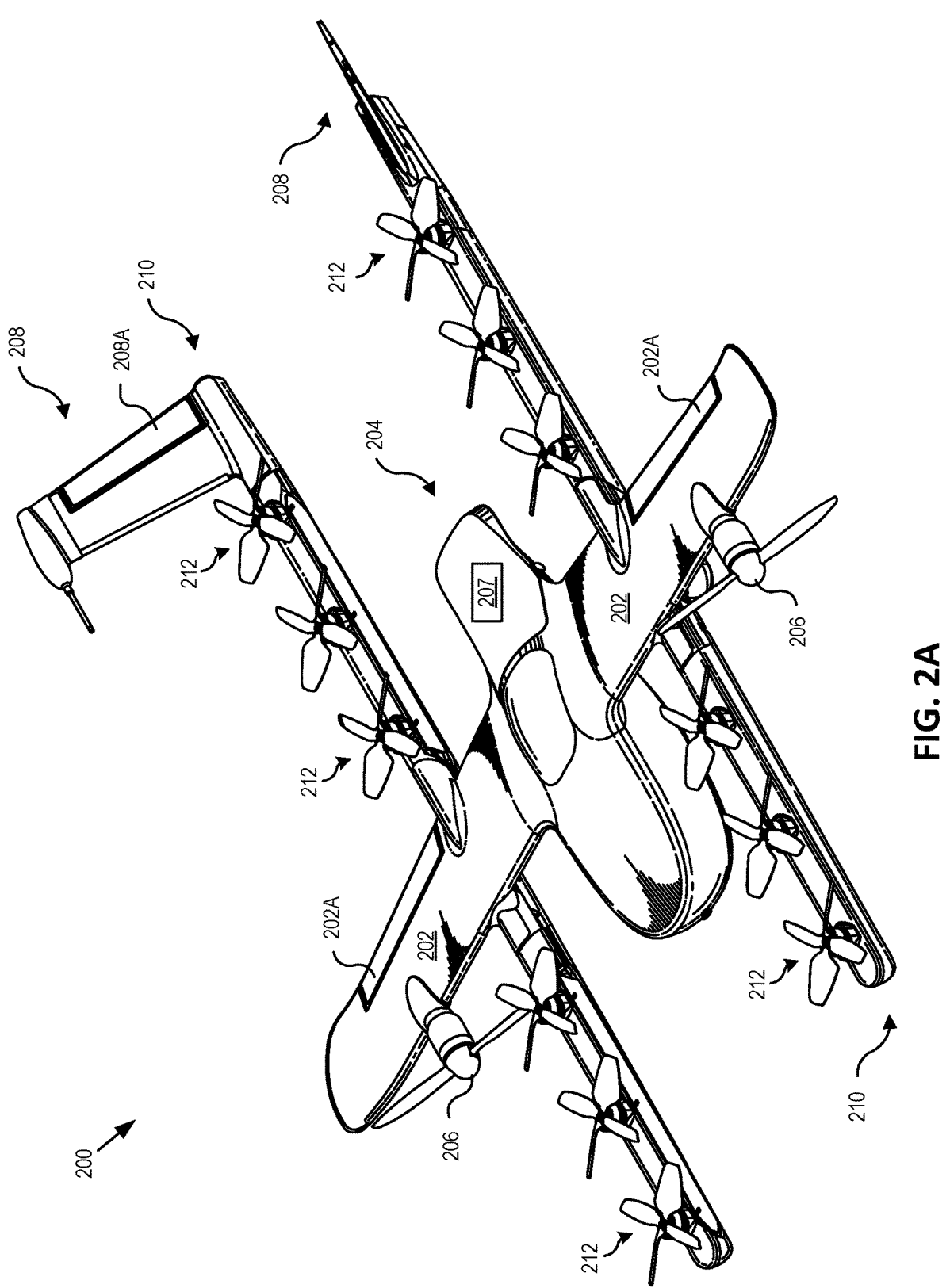
FIG. 2A and FIG. 2B are topside perspective view and bottom side plan view illustrations, respectively, of a UAV that has an onboard camera system, in accordance with various embodiments of the disclosure.
Figure 2B:
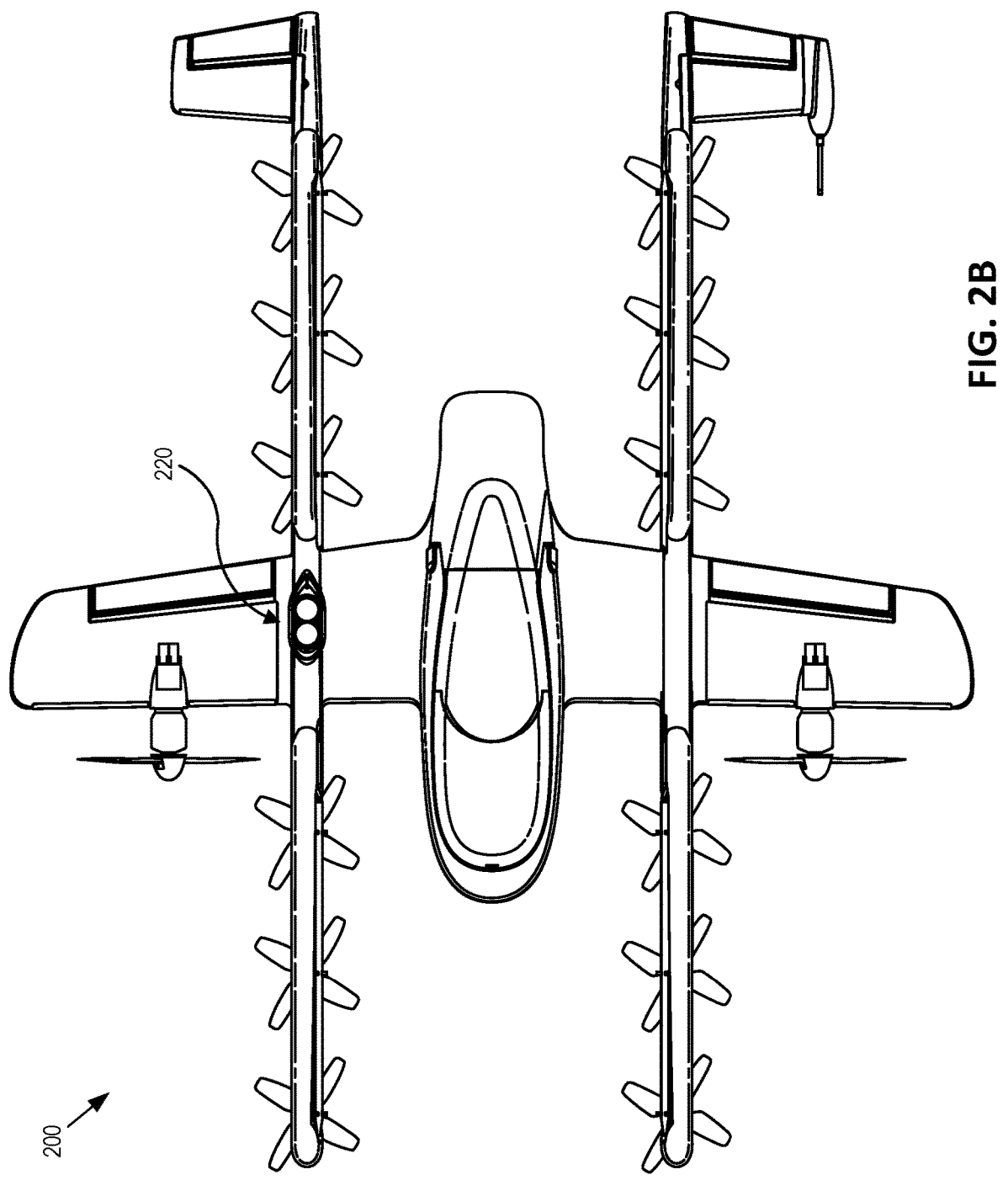

FIG. 2A and FIG. 2B illustrate an aerial vehicle or UAV 200 that is well suited for delivery of packages, in accordance with an embodiment of the present disclosure. FIG. 2A is a topside perspective view illustration of the UAV 200 while FIG. 2B is a bottom side plan view illustration of the same. The UAV 200 is one possible implementation of the UAVs 102 illustrated in FIG. 1, although other types of UAVs may be implemented as well.

The illustrated embodiment of the UAV 200 is a vertical takeoff and landing (VTOL) UAV that includes separate propulsion units 206 and 212 for providing horizontal and vertical propulsion, respectively. The UAV 200 is a fixed-wing aerial vehicle, which as the name implies, has a wing assembly 202 that can generate lift based on the wing shape and the vehicle's forward airspeed when propelled horizontally by the propulsion units 206. The illustrated embodiment of the UAV 200 has an airframe that includes a fuselage 204 and the wing assembly 202. In one embodiment, the fuselage 204 is modular and includes a battery module, an avionics module, and a mission payload module. These modules are detachable from each other and mechanically securable to each other to contiguously form at least a portion of the fuselage 204 or UAV main body.

The battery module (e.g., fore portion of the fuselage 204) includes a cavity for housing one or more batteries for powering the UAV 200. The avionics module (e.g., aft portion of the fuselage 204) houses flight control circuitry of the UAV 200, which can include a processor and memory, communication electronics and antennas (e.g., cellular transceiver, Wi-Fi transceiver, etc.), and various sensors (e.g., global positioning sensor, an inertial measurement unit (IMU), a magnetic compass, etc.). Collectively, these functional electronic subsystems for controlling the UAV 200, communicating, and sensing the environment may be referred to as a control system 207. The mission payload module (e.g., middle portion of the fuselage 204) houses equipment associated with a mission of the UAV 200. For example, the mission payload module can include a payload actuator (not shown) for holding and releasing an externally attached payload.

In another embodiment, the mission payload module can include a camera/sensor equipment holder for carrying camera/sensor equipment (e.g., camera, lenses, radar, LIDAR, pollution monitoring sensors, weather monitoring sensors, etc.). In FIG. 2B, an onboard camera 220 is mounted to the underside of the UAV 200 to support a computer vision system (e.g., stereoscopic machine vision) for visual triangulation and navigation as well as operate as an optical code scanner for reading visual codes affixed to packages. Although the onboard camera 220 is shown in a position on the UAV 200 for purposes of illustration, the onboard camera 220 can be located in any position on the UAV 200, or can be integrated into the fuselage 204 and have windows for vision. These visual codes may be associated with or otherwise match to delivery missions and provide the UAV with a handle for accessing destination, delivery, and package validation information. The onboard camera 220 may further include one or more light sources for illumination during low light environments. In some embodiments, the light source can be an infrared illuminator.

Figure 3:
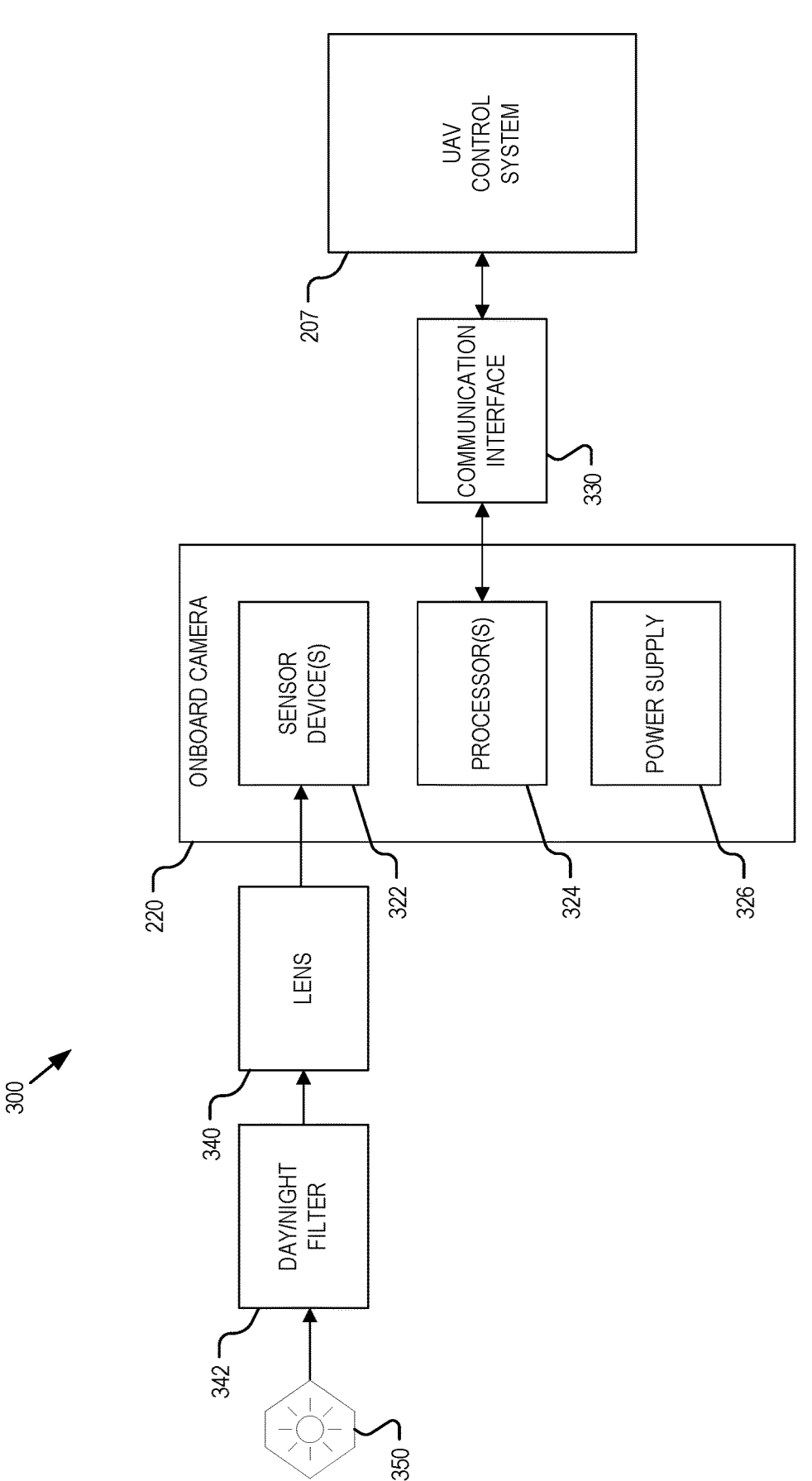
FIG. 3 is a block diagram that illustrates an onboard camera system of a UAV, in accordance with various embodiments of the disclosure.

FIG. 3 is a block diagram that illustrates an onboard camera system 300 of a UAV, in accordance with various embodiments of the disclosure. In some embodiments, the UAV is an aircraft such as the UAV 105 illustrated in FIG. 1, or the UAV 200 illustrated in FIG. 2A and FIG. 2B. As shown, the onboard camera system 300 includes the onboard camera 220 described above with reference to FIG. 2B. The onboard camera can include a sensor device 322, one or more processors 324, and a power supply 326. Other well-known components of an onboard camera have been omitted for clarity in the description herein. The onboard camera 220 can be configured to communicate with the UAV control system 207 through a communication interface 330. In some embodiments, the communication interface 330 can be integrated into the onboard camera 220, or can be integrated into the UAV control system 207.

The onboard camera 220 can include any suitable type of camera for capturing imagery from the point of view of the UAV 200. For example, the onboard camera 220 may include one or more of a downward-facing camera or an angled-view camera, and can be a visible light camera, an infrared camera, a light-field camera, a laser camera, a time-of-flight camera, or another suitable type.

In some embodiments, the sensor device 322 can be a color or monochrome sensor capable of conversion of photons of light into electrons (known as photoelectrons) to produce an image. For example, the types of sensor device 322 disclosed herein can include charge-coupled devices (CCD), electron-multiplying charge-coupled devices (EMCCD), complementary metal-oxide-semiconductor (CMOS), back-illuminated CMOS, and other suitable sensor types.

In some embodiments, the processor 324 may include any type of computer processor capable of receiving signals from the sensor device 322 and other components of the UAV 200 and executing instructions stored on a computer-readable medium in communication with the UAV control system 207. In some embodiments, the computer-readable medium may include one or more devices capable of storing information for access by the processor 324. In some embodiments, the computer-readable medium may include one or more of a hard drive, a flash drive, an EEPROM, and combinations thereof. The processor 324 can include any suitable type of general-purpose computer processor. In some embodiments, the processor 324 can include one or more special-purpose computer processors or AI accelerators optimized for specific computing tasks, including but not limited to graphical processing units (GPUs), vision processing units (VPUs), and tensor processing units (TPUs).

In some embodiments, the communication interface 330 includes hardware and software to enable any suitable communication technology for communicating with a separate control system (e.g., a fleet management system) located remotely (e.g., a computing system located at the terminal area 100, at a central control center, generally in the cloud, etc.). The remote-located control system can include processors, communication interfaces, sensor propulsion devices, data stores, computer-readable media, and software configured to communicate with the UAV to provide, e.g., route data, knowledge graph data, and other instructions. In some embodiments, the communication interface 330 includes multiple communication interfaces, each for use in appropriate circumstances. For example, the communication interface 330 may include a long-range wireless interface such as a 4G or LTE interface, or any other type of long-range wireless interface (e.g., 2G, 3G, 5G, or WiMAX), to be used to communicate with the remote-located control system and/or onboard control system 207 while traversing a route. The communication interface 330 may also include a medium-range wireless interface such as a Wi-Fi interface to be used when the UAV 200 is at an area near a start location or an endpoint where Wi-Fi coverage is available. The communication interface 330 may also include a short-range wireless interface such as a Bluetooth interface to be used when the UAV 200 is in a maintenance location or is otherwise stationary and waiting to be assigned a route. The communication interface 330 may also include a wired interface, such as an Ethernet interface or a USB interface, which may also be used when the UAV 200 is in a maintenance location or is otherwise stationary and waiting to be assigned a route.

The sensor device 322 can receive light energy (photons) generated by a light source 350 (e.g., the sun, an IR illuminator, etc.) through a lens 340. The lens 340 can be any suitable type of lens or lens assembly for focusing the light energy for proper image creation by the onboard camera 220. In some embodiments, the lens 340 can be any combination of macro, telephoto, wide angle, standard, and/or specialty lenses (e.g., tilt-shift, etc.), and can be either prime or zoom variations. For example, the UAV 200 may include a macro lens for recognition of close objects, such as barcodes, a telephoto lens for object detection, and a wide angle lens for navigation. In these embodiments, the onboard camera 220 can include separate sensor devices 322 for each type of lens.

The light energy from the light source 350 can be filtered by a day/night filter 342, in accordance with embodiments of the present disclosure. As described above, the filter 342 can be configured to limit visible light and prevent overexposure of the camera sensor in bright light conditions, while permitting IR light transmission during low light conditions. IR light has longer wavelengths than visible light, and certain materials and coatings can be engineered to selectively transmit these longer wavelengths while blocking a portion or all of the shorter visible wavelengths. Neutral density (ND) filters are generally configured to attenuate light across all wavelengths, and as such are not generally compatible with the onboard camera system 300 as they would prevent the onboard camera 220 from performing objectives during night operation. Several types of IR pass filters are specifically designed to absorb or reflect all visible light (wavelengths from 380 nm to 700 nm), while allowing near infrared and/or infrared light (generally wavelengths greater than 700 nm, or from about 780 nm to 1 mm) to pass through, and are often made of materials that are opaque or reflective to visible light but transparent to infrared. This type of filter is not compatible with the onboard camera system 300 because the filter will block all or most of the visible light needed by the onboard camera 220 to function during daylight conditions. In some embodiments, the filters of the present disclosure can be tailored to absorb or reflect infrared light in the range of the light band of the infrared illuminator used with the light source of the UAV 200, such as a range of 700 nm to 900 nm, a range of 750 nm to 875 nm, a range of 800 nm to 860 nm, or about 850 nm.

In some embodiments, the filter 342 can be a wavelength attenuating filter configured to attenuate a portion of the visible spectrum while transmitting a maximum of infrared light. Embodiments of the filter 342 can be tailored to absorb and/or reflect certain wavelengths of visible light or attenuate the light energy uniformly across the visible spectrum. In an embodiment, the filter 342 has the following properties in terms of transmission T and reflectivity R: (1) T=28% to 50% at wavelengths of about 430 nm to about 640 nm, which attenuates visible light in the spectrum range between a factor of about 2 to about 4; and (2) T≥80% at about 840 nm to about 860 nm to pass infrared light from an infrared illuminator at about 850 nm. In further embodiments, the filter 342 can include the properties above and additionally include: (3) R≤3% at about 400 nm to about 900 nm to prevent back-reflections of the lens visible in the image of the camera system; and (4) T≤5% at about 950 nm to about 1000 nm based on a sensor requirement of the camera. The filter 342 can be made from toughened glass. In some embodiments, the filter 342 can be integrated into the lens 340 (e.g., forming a layer of a lens laminate), or can be removably coupled to the lens 340, such as by mechanical coupling (adhesive, threads, twist-to-lock, friction fit, etc.), by magnetic coupling, etc., and in these configurations can provide protection to the lens from damage by impact of dirt and other debris. In an embodiment, the filter 342 is operably coupled to the lens with double-sided adhesive tape around a perimeter of the filter 342, with the double-sided adhesive tape having water-resistant and shock-resistant properties.

Returning to FIGS. 2A and 2B, the illustrated embodiment of the UAV 200 further includes the horizontal propulsion units 206 positioned on the wing assembly 202, which can each include a motor, shaft, motor mount, and propeller, for propelling the UAV 200 generally horizontally. The illustrated embodiment of the UAV 200 includes two boom assemblies 210 that secure to the wing assembly 202. Vertical propulsion units 212 can be mounted to the boom assemblies 210. The vertical propulsion units 212 providing vertical propulsion. The vertical propulsion units 212 may be used during a hover mode where the UAV 200 is descending (e.g., to a delivery location), ascending (e.g., at initial launch or following a delivery), or maintaining a constant altitude. Stabilizers 208 (or tails) may be included with the UAV 200 to control pitch and stabilize the aerial vehicle's yaw (left or right turns) during cruise. In some embodiments, during cruise mode, the vertical propulsion units 212 are disabled or powered low, and during hover mode, the horizontal propulsion units 206 are disabled or powered low.

During flight, the UAV 200 may control the direction and/or speed of its movement by controlling its pitch, roll, yaw, and/or altitude. Thrust from the propulsion units 206 is generally horizontal and used to control air speed. For example, the stabilizers 208 may include one or more rudders 208A for controlling the aerial vehicle's yaw, and the wing assembly 202 may include elevators for controlling the aerial vehicle's pitch and/or ailerons 202A for controlling the aerial vehicle's roll. As another example, increasing or decreasing the speed of all the propellers simultaneously can result in UAV 200 increasing or decreasing its altitude, respectively. The UAV 200 may also include components for sensing the environment around the UAV 200, including but not limited to an audio sensor 222 and an audio sensor 214.

Many variations on the illustrated fixed-wing aerial vehicle are possible. For instance, aerial vehicles with more wings (e.g., an "x-wing" configuration with four wings), are also possible. Although FIG. 2A and FIG. 2B illustrate one wing assembly 202, two boom assemblies 210, two horizontal propulsion units 206, and six vertical propulsion units 212 per boom assembly 210, it should be appreciated that other variants of the UAV 200 may be implemented with more or fewer of these components.

It should be understood that references herein to an "unmanned" aerial vehicle or UAV can apply equally to autonomous and semi-autonomous aerial vehicles. In a fully autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator may control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

In the preceding description, numerous specific details are set forth to provide a thorough understanding of various embodiments of the present disclosure. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A non-transitory computer-readable medium having logic stored thereon that, in response to execution by one or more processors of an unmanned aerial vehicle (UAV), causes the UAV to perform actions comprising:
 traveling along a route of the UAV at night; and
 acquiring an aerial image with an onboard camera, the onboard camera comprising:
  a sensor device for receiving photons and converting the photons into photoelectrons;
  a processor for processing the photoelectrons into an image file;
  a lens positioned adjacent to the sensor device for focusing the photons on the sensor device; and
  a filter positioned adjacent to an outer surface of the lens, wherein the filter has a first transmission property that permits a majority of the photons in an infrared light spectrum from 840 nm to 860 nm to pass to the lens, and wherein the filter has a second transmission property that attenuates a majority of the photons in a visible light spectrum from 430 nm to 640 nm prior to reaching the lens, wherein the second transmission property reduces oversaturation of the sensor device during daytime operations of the UAV while the first transmission property enables use of an infrared illuminator on the UAV during nighttime operations of the UAV.

2. The non-transitory computer-readable medium of claim 1, further comprising activating an infrared illuminator during acquiring the aerial image with the onboard camera.

3. The non-transitory computer-readable medium of claim 1, wherein the sensor device is a grayscale monochrome sensor.

4. The non-transitory computer-readable medium of claim 1, wherein the second transmission property attenuates from 28% to 50% of the photons in the visible spectrum, and the first transmission property permits greater than or equal to 80% of the photons in the infrared spectrum.

5. The non-transitory computer-readable medium of claim 4, wherein the filter has a reflectivity property of less than or equal to 3% at wavelengths from 400 nm to 900 nm.

6. The non-transitory computer-readable medium of claim 5, wherein the filter has a third transmission property of less than or equal to 5% at wavelengths in the infrared spectrum from 950 nm to 1000 nm.

7. The non-transitory computer-readable medium of claim 1, wherein the filter is removably couplable to the lens with a double-sided adhesive tape having water-resistance and shock-resistance properties.

8. The non-transitory computer-readable medium of claim 1, further comprising transmitting the image file of the aerial image from the onboard camera to a UAV control system via a communication interface.

9. The non-transitory computer-readable medium of claim 8, further comprising transmitting the image file of the aerial image to a fleet management system.

10. The non-transitory computer-readable medium of claim 8, further comprising analyzing the image file of the aerial image to visually triangulate the position of the UAV.

11. The non-transitory computer-readable medium of claim 8, further comprising:
 analyzing the image file of the aerial image to detect obstacles; and adjusting the route to an adjusted route that deconflicts with the detected obstacle.

12. The non-transitory computer-readable medium of claim 1, further comprising:

traveling along a second route of the UAV during the day; and acquiring a second aerial image with the onboard camera.

13. At least one non-transitory machine-accessible storage medium that provides instructions that, when executed by a controller of an unmanned aerial vehicle (UAV), will cause the UAV to perform operations, comprising:

traveling along a first route of the UAV at night;

acquiring a nighttime aerial image;

traveling along a second route of the UAV during the day; and acquiring a daytime aerial image, wherein the nighttime and daytime aerial images are acquired with an onboard camera, the onboard camera comprising:

a sensor device for receiving photons and converting the photons into photoelectrons;

a lens positioned adjacent to the sensor device for focusing the photons on the sensor device; and a day/night filter positioned adjacent to an outer surface of the lens, wherein the filter has a first transmission property that permits a majority of the photons in an infrared light spectrum from 840 nm to 860 nm to pass to the lens, and wherein the filter has a second transmission property that attenuates a majority of the photons in a visible light spectrum from 430 nm to 640 nm prior to reaching the lens, wherein the second transmission property reduces oversaturation of the sensor device during daytime operations of the UAV while the first transmission property enables use of an infrared illuminator on the UAV during nighttime operations of the UAV.

14. The at least one non-transitory machine-accessible storage medium of claim 13, further comprising activating an infrared illuminator during acquiring the nighttime aerial image with the onboard camera.

15. The at least one non-transitory machine-accessible storage medium of claim 13, wherein the sensor device is a grayscale monochrome sensor.

16. The at least one non-transitory machine-accessible storage medium of claim 13, wherein the second transmission property attenuates from 28% to 50% of the photons in the visible spectrum, and the first transmission property permits greater than or equal to 80% of the photons in the infrared spectrum.

17. The at least one non-transitory machine-accessible storage medium of claim 16, wherein the filter has a reflectivity property of less than or equal to 3% at wavelengths from 400 nm to 900 nm.

18. The at least one non-transitory machine-accessible storage medium of claim 17, wherein the filter has a third transmission property of less than or equal to 5% at wavelengths in the infrared spectrum from 950 nm to 1000 nm.

19. The at least one non-transitory machine-accessible storage medium of claim 13, wherein the filter is removably couplable to the lens with a double-sided adhesive tape having water-resistance and shock-resistance properties.

20. The at least one non-transitory machine-accessible storage medium of claim 13, further comprising transmitting at least one of the nighttime aerial image or the daytime aerial image from the onboard camera to a UAV control system via a communication interface.

21. The at least one non-transitory machine-accessible storage medium of claim 20, further comprising transmitting at least one of the nighttime aerial image or the daytime aerial image to a fleet management system.

22. The at least one non-transitory machine-accessible storage medium of claim 20, further comprising analyzing the nighttime or daytime aerial image to visually triangulate the position of the UAV.

23. The at least one non-transitory machine-accessible storage medium of claim 20, further comprising:

analyzing the nighttime or daytime aerial image to detect obstacles; and adjusting the first and/or second route to an adjusted route that deconflicts with the detected obstacle.

24. A unmanned aerial vehicle (UAV), comprising:

an onboard camera including an image sensor adapted for receiving photons and converting the photons into photoelectrons;

an infrared emitter adapted to generate infrared illumination;

a processor coupled to the onboard camera for processing the photoelectrons into an image file; and a filter positioned over a lens of the onboard camera, wherein the filter has a first transmission property that permits a majority of the photons in an infrared light spectrum from 840 nm to 860 nm to pass to the lens, and wherein the filter has a second transmission property that attenuates a majority of the photons in a visible light spectrum from 430 nm to 640 nm prior to reaching the lens, wherein the second transmission property reduces oversaturation of the sensor device during daytime operations of the UAV while the first transmission property enables use of the infrared illuminator on the UAV during nighttime operations of the UAV.

* * * * *